US011930564B2

(12) United States Patent
Leigh

(10) Patent No.: US 11,930,564 B2
(45) Date of Patent: Mar. 12, 2024

(54) CERAMIC ELECTRIC HEATING ELEMENT

(71) Applicant: Chongqing Le-Mark Ceramic Technology Co. Limited, Chongqing (CN)

(72) Inventor: Peter Leigh, Chongqing (CN)

(73) Assignee: CHONGQING LE-MARK TECHNOLOGY CO, Chongqing (CN)

( * ) Notice: Subject to any disclaimer, the term of this patent is extended or adjusted under 35 U.S.C. 154(b) by 410 days.

(21) Appl. No.: 17/209,643

(22) Filed: Mar. 23, 2021

(65) Prior Publication Data

US 2021/0212171 A1 Jul. 8, 2021

Related U.S. Application Data

(63) Continuation of application No. 15/550,756, filed as application No. PCT/CN2016/095420 on Aug. 16, 2016, now Pat. No. 10,993,288.

(30) Foreign Application Priority Data

Aug. 21, 2015 (CN) ........................ 201510518736.2

(51) Int. Cl.
*H05B 3/14* (2006.01)
*F23Q 7/00* (2006.01)
(Continued)

(52) U.S. Cl.
CPC ............. *H05B 3/141* (2013.01); *F23Q 7/001* (2013.01); *H05B 3/18* (2013.01); *H05B 3/28* (2013.01);
(Continued)

(58) Field of Classification Search
CPC .......... H05B 3/141; H05B 3/28; H05B 3/283; H05B 3/18; H05B 2203/027
See application file for complete search history.

(56) References Cited

U.S. PATENT DOCUMENTS

| | | | |
|---|---|---|---|
| 1,927,562 | A | 9/1933 | Dorner |
| 1,950,457 | A | 3/1934 | Payne |

(Continued)

FOREIGN PATENT DOCUMENTS

| | | |
|---|---|---|
| CN | 2415573 | 1/2001 |
| CN | 2537193 | 2/2003 |

(Continued)

OTHER PUBLICATIONS

JP, Notice of Reasons for Refusal, 2018-528371 (Office Action for Patent Application in Japan).

*Primary Examiner* — John J Norton
(74) *Attorney, Agent, or Firm* — Allan Watts PLLC

(57) ABSTRACT

Disclosed is a ceramic electric heating element. The ceramic electric heating element is completely wrapped by an insulating layer. The ceramic electric heating element can prevent the occurrence of a short circuit when the ceramic electric heating element is in use or is installed. The strength of the ceramic electric heating element is increased, and the shock resistance is enhanced. The service life of the ceramic electric heating element is prolonged, and the power-on duration of the ceramic electric heating element is prolonged. Moreover, the process is simplified, the structure is simple, and the cost is low.

6 Claims, 5 Drawing Sheets

(51) Int. Cl.
*H05B 3/18* (2006.01)
*H05B 3/28* (2006.01)
*H05B 3/48* (2006.01)

(52) U.S. Cl.
CPC ......... *H05B 3/48* (2013.01); *H05B 2203/027* (2013.01)

(56) References Cited

U.S. PATENT DOCUMENTS

| | | | | |
|---|---|---|---|---|
| 2,127,983 | A | 8/1938 | Nowosielski | |
| 4,418,661 | A | 12/1983 | Esper | |
| 4,437,440 | A | 3/1984 | Suzuki | |
| 4,475,029 | A | 10/1984 | Yoshida | |
| 4,540,479 | A | 9/1985 | Sakurai | |
| 4,742,209 | A | 5/1988 | Minegishi | |
| 4,806,734 | A | 2/1989 | Masaka | |
| 4,816,643 | A | 3/1989 | Zulauf | |
| 4,901,196 | A | 2/1990 | Grzybowski | |
| 5,075,536 | A | 12/1991 | Towe | |
| 5,084,606 | A | 1/1992 | Bailey | |
| 5,084,607 | A | 1/1992 | Shafer | |
| 5,304,778 | A | 4/1994 | Dasgupta | |
| 5,519,187 | A | 5/1996 | Hinkle | |
| 5,589,091 | A | 12/1996 | Muller | |
| 5,880,432 | A | 3/1999 | Radmacher | |
| 5,993,722 | A | 11/1999 | Radmacher | |
| 6,084,212 | A | 7/2000 | Leigh | |
| 6,184,497 | B1 | 2/2001 | Leigh | |
| 6,396,028 | B1 | 5/2002 | Radmacher | |
| 6,884,967 | B1 | 4/2005 | Leigh | |
| 7,607,206 | B2 | 10/2009 | Walker | |
| 2002/0185485 | A1 | 10/2002 | Radmacher | |
| 2008/0302776 | A1* | 12/2008 | Arima | F23Q 7/001 219/270 |
| 2014/0042149 | A1 | 2/2014 | Kyocera | |
| 2015/0014302 | A1* | 1/2015 | Ikai | B28B 11/00 219/544 |

FOREIGN PATENT DOCUMENTS

| | | |
|---|---|---|
| CN | 101031168 | 9/2007 |
| CN | 102705131 | 10/2012 |
| CN | 105072718 | 11/2015 |
| CN | 205179394 | 4/2016 |
| DE | 1297785 | 6/1969 |
| DE | 3318458 | 11/1984 |
| DE | 8815005 | 3/1990 |
| EP | 648977 | 4/1995 |
| EP | 648978 | 4/1995 |
| JP | 10-247584 | 9/1998 |
| JP | 2004-524648 | 8/2004 |

* cited by examiner

PRIOR ART

PRIOR ART

CERAMIC ELECTRIC HEATING ELEMENT

RELATED PATENT APPLICATIONS

This U.S. patent application is a continuation patent application of, and claims priority to, U.S. patent application Ser. No. 15/550,756, filed Aug. 11, 2017, which is a US National Stage patent application of Patent Cooperation Treaty (PCT) patent application PCT/CN2016/095420, filed Aug. 16, 2016, which claims priority to China Patent Application: 201510518736.2, filed Aug. 21, 2015. The contents of the priority patent applications are incorporated herein by reference. If there are any conflicts or inconsistencies between this patent application and the incorporated patent applications, however, this patent application governs herein.

TECHNICAL FIELD

The present invention relates to an electric heating element, and in particular to a ceramic electric heating element.

BACKGROUND

The existing ceramic electric heating elements are advantageous in terms of quick start and high temperature, however suffer from drawbacks such as poor shock resistance, a short distance between the outer conducting layer and the inner conducting layer at the lower end, easy undesired connection, and many processing procedures.

In order to solve the above problems, Chinese Patent No. CN 100496169C discloses a completely ceramic six-layered electric heating element, where "the completely ceramic six-layered electric heating element comprises an inner conducting layer, an inner resistive layer, an inner insulating layer, an outer resistive layer, an outer conducting layer, an outer insulating layer, and a central electrode socket; the inner conducting layer is located in the center of the electric heating element, and the central electrode socket is located in the center of the bottom end of the inner conducting layer; the inner resistive layer is divided into two segments, with the external diameter of the lower segment being greater than that of the upper segment, and the lower segment of the inner resistive layer wraps the inner conducting layer on the outside; the inner insulating layer is divided into three segments, where the middle segment has an external diameter greater than that of the upper segment, the lower segment has an external diameter greater than that of the middle segment, the upper segment of the inner insulating layer wraps the upper segment of the inner resistive layer on the outside, and the middle segment and the lower segment of the inner insulating layer wraps the lower segment of the inner resistive layer on the outside; the outer resistive layer is divided into two segments, where the upper segment thereof wraps the upper segment of the inner insulating layer on the outside, the lower segment of the outer resistive layer wraps the middle segment of the inner insulating layer on the outside, and the lower segment of the outer resistive layer has an external diameter less than that of the lower segment of the inner insulating layer; there is a connecting hole on the top of the upper segment of the inner insulating layer, and a part of the material of the outer resistive layer is connected to a part of the material of the inner resistive layer at the connecting hole; the outer conducting layer wraps the lower segment of the outer resistive layer on the outside, and the outer conducting layer is divided into two segments, where the lower segment thereof has an external diameter equaling to that of the lower segment of the inner insulating layer, the upper segment of the outer conducting layer has an external diameter less than that of the lower segment of the outer conducting layer, and the lower segment of the outer conducting layer is a spot where a side electrode is connected; and the outer insulating layer wraps the upper segment of the outer conducting layer on the outside," for more information see FIG. 1.

Those of skill in the art used the ceramic six-layered electric heating element made according to the technical solution provided in the above patent document and found that the ceramic six-layered electric heating element has the following drawbacks: 1. the ceramic six-layered electric heating element will easily over-lap a metal material in the installation and use of the environment, thereby producing a short circuit; 2. oxidization and carbon deposition will occur after using it for a long period of time; 3. the strength is insufficient, and the shock resistance still fails to meet the requirements; 4. the outer surface layer is susceptible to microcracks in the processes of production and use, leading to a poor appearance quality; 5. the spot where the central electrode is welded has a poor temperature-resistant capacity while the product is powered-on for a long period of time, which severely effects the service life of the product; 6. the surface of the electric heating element has many defects; and 7. the one-time power-on duration is short.

SUMMARY

An objective of the present invention is to provide a ceramic electric heating element that can prevent a short circuit and has high strength.

In order to achieve the above objective, the present invention is achieved by a ceramic electric heating element, an upper tip portion of which is wrapped completely by an insulating layer. As for the existing ceramic electric heating elements, a short circuit resulting from over-lapping with metal frequently occurs in the processes of installation and use, and also the surface of the ceramic electric heating element will suffer from carbon deposition after using it for a long period of time, thereby producing a short circuit of the electric heating element. The complete wrapping of the existing ceramic electric heating element by an insulating layer can prevent occurrence of the above phenomenons, can increase the strength of the ceramic electric heating element to enhance shock resistance thereof and can also isolate the exothermic layer of the electric heating element from the surface air so as to reduce surface defects thereof.

In order to further improve compatibility of the ceramic electric heating element, the ceramic electric heating element has at least two layers.

In order to further allow the ceramic electric heating element to have a broad temperature zone and a high power, the ceramic electric heating element has five layers.

In order to further enhance functions of the ceramic electric heating element and make the surface of the electric heating element more dense, the ceramic electric heating element has, from the inside out, an inner conducting layer, an inner insulating layer, an outer resistive layer, an outer conducting layer, and an outer insulating layer, respectively.

In order to further optimize the structure of the ceramic electric heating element, the inner conducting layer is located in the center of the ceramic electric heating element; the inner insulating layer wraps the inner conducting layer on the outside, and the inner insulating layer is divided into two segments, with the peripheral profile of the lower segment being greater than that of the upper segment; the outer resistive layer wraps the upper part of the inner insulating layer on the outside, and the outer resistive layer is divided into two segments, with the peripheral profile of the lower segment being less than that of the upper segment, and the peripheral profile of the upper segment of the outer resistive layer being less than that of the lower segment of the inner insulating layer; the outer conducting layer wraps the lower segment of the outer resistive layer on the outside, and the outer conducting layer is divided into two segments, with the peripheral profile of the lower segment equaling to that of the lower segment of the inner insulating layer, and the peripheral profile of the upper segment equaling to that of the upper segment of the outer resistive layer; the outer insulating layer wraps the upper segment of the outer conducting layer and the upper segment of the outer resistive layer on the outside, with the peripheral profile of the outer insulating layer equaling to that of the lower segment of the outer conducting layer; and the lower part of the inner conducting layer is a spot where a central electrode is located, the upper end of the inner insulating layer has a connecting hole, and the outside of the lower part of the outer conducting layer is a spot (9) where a side electrode is connected.

In order to further allow the electric heating element to start and heat up quickly, the ceramic electric heating element has six layers.

In order to further enhance functions of the ceramic electric heating element, the ceramic electric heating element has, from the inside out, an inner conducting layer, an inner resistive layer, an inner insulating layer, an outer resistive layer, an outer conducting layer and an outer insulating layer.

In order to further improve the strength of the ceramic electric heating element to allow it to be capable of starting quickly, the inner conducting layer is located in the center of the ceramic electric heating element; the inner resistive layer wraps the inner conducting layer on the outside; the inner insulating layer wraps the inner resistive layer on the outside, and the inner insulating layer is divided into two segments, with the peripheral profile of the lower segment being greater than that of the upper segment; the outer resistive layer wraps the upper part of the inner insulating layer on the outside, and the outer resistive layer is divided into two segments, with the peripheral profile of the upper segment of the outer resistive layer being less than that of the lower segment of the inner insulating layer; the outer conducting layer wraps the lower segment of the outer resistive layer on the outside, and the outer conducting layer is divided into two segments, with the peripheral profile of the lower segment equaling to that of the lower segment of the inner insulating layer, and the peripheral profile of the upper segment equaling to that of the upper segment of the outer resistive layer; the outer insulating layer wraps the upper segment of the outer conducting layer and the upper segment of the outer resistive layer on the outside, with the peripheral profile of the outer insulating layer equaling to that of the lower segment of the outer conducting layer; and the lower part of the inner conducting layer is a spot where a central electrode is located, the upper end of the inner resistive layer has a connecting hole, and the outside of the lower part of the outer conducting layer is a spot where a side electrode is connected.

In order to further simplify the structure of the ceramic electric heating element, the ceramic electric heating element has four layers. Such an arrangement can also save material and reduce cost.

In order to further enhance functions of the ceramic electric heating element, the ceramic electric heating element has, from the inside out, an inner conducting layer, an inner insulating layer, a resistive layer and an outer insulating layer.

In order to further optimize the structure of the ceramic electric heating element, the inner conducting layer is located in the center of the ceramic electric heating element; the inner insulating layer wraps the inner conducting layer on the outside, and the inner insulating layer is divided into two segments, with the peripheral profile of the lower segment being greater than that of the upper segment; the resistive layer wraps the upper part of the inner insulating layer on the outside, and the resistive layer is divided into two segments, with the peripheral profile of the upper segment being less than that of the lower segment, and the peripheral profile of the lower segment of the resistive layer equaling to that of the lower segment of the inner insulating layer; the outer insulating layer wraps the upper segment of the resistive layer on the outside, with the peripheral profile of the outer insulating layer equaling to that of the lower segment of the resistive layer; and the lower part of the inner conducting layer is a spot where a central electrode is located, the upper end of the resistive layer has a connecting hole, and the outside of the lower part of the resistive layer is a spot where a side electrode is connected.

In order to further improve the service life of the ceramic electric heating element and reduce surface defects thereof, the spot where the central electrode is located is solid. In the existing ceramic electric heating elements, there is a V-type socket at the central electrode, and an electrically conductive ceramic electrode is then plugged into the V-type socket. However, in the operation process of such a ceramic electric heating element, the electrically conductive ceramic electrode will generate heat and swell, resulting in formation of microcracks in the ceramic electric heating element and in the end reducing the service life thereof. Additionally, when the power-on time is too long, a weld zone of the central electrode inside will be damaged, causing the product to fracture, and effecting the service life thereof. The arrangement of the central electrode as a solid and then welding the electrically conductive ceramic electrode to the spot where the central electrode is located can prevent formation of microcracks in the ceramic electric heating element resulting from heat generation and swelling of the electrically conductive ceramic electrode; prevent damage to the inside of the ceramic body, thereby improving service life of the ceramic electric heating element; and eliminate damage to the inside of the ceramic body in the welding process and reduce surface defects of the electric heating element.

In order to further optimize the structure of the ceramic electric heating element, the ceramic electric heating element is a cylinder or a flat-shaped body. Such an arrangement can allow the ceramic electric heating element to have a simplified process during production and a simple structure.

The employment of the ceramic electric heating element according to the present invention has the following beneficial effects:

1. Short circuiting can be prevented when the ceramic electric heating element is in use or is installed; the complete wrapping of the ceramic electric heating element by the insulating layer on the outside can prevent a short circuit resulting from over-lapping the ceramic electric heating element with metal in the processes of installation and use, and can also prevent a short circuit due to carbon deposition on the surface of the ceramic body after using it for a long period of time;

2. The strength of the ceramic electric heating element is improved, and the shock resistance is enhanced; and when the surface of the ceramic electric heating element is not completely wrapped by an insulating layer, the strength is 10 to 20 KG, the shock resistance is poor, and the insulating capacity is zero, and when the surface of the ceramic electric heating element is completely wrapped by an insulating layer, the strength is 25 to 45 KG, the shock resistance is good, and the insulating capacity is 2000 ohm;

3. The service life of the ceramic electric heating element is improved; the arrangement of the central electrode as a solid and welding of the electrically conductive ceramic electrode to the spot where the central electrode is located can prevent formation of microcracks in the ceramic electric heating element, also prevent damage to the inside of the ceramic body, and improve the service life thereof; and the existing ceramic electric heating elements with the electrically conductive ceramic electrode plugged into the V-type socket at the central electrode has an average service life of 10,000 to 20,000 switching cycles before failure, whereas the ceramic electric heating element, according to the present invention, has an average service life of 25,000 to 40,000 switching cycles before failure;

4. The power-on duration of the ceramic electric heating element is increased; and the one-time power-on duration of the existing ceramic electric heating elements is from several seconds to several tens of seconds, whereas the one-time power-on duration of the ceramic electric heating element according to the present invention is from 1 to 8 minutes; and 5. The process is simplified, the structure is simple, and the cost is low.

Explanation of reference numbers: 1. inner conducting layer; 2. inner insulating layer; 3. outer resistive layer; 4 outer conducting layer; 5. outer insulating layer; 6. inner resistive layer; 7. spot where a central electrode is located; 8. connecting hole; 9. spot where the side electrode is connected; 10. electrically conductive cover, 11. resistive layer.

DETAILED DESCRIPTION

Figure 1:
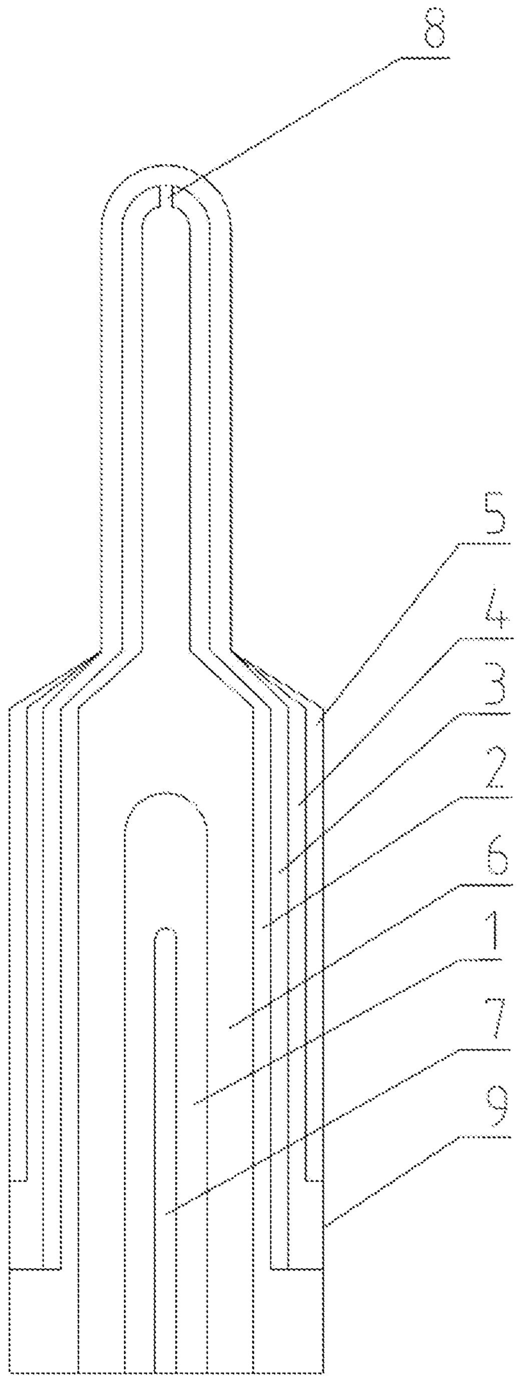
FIG. 1 is a structure of an existing ceramic electric heating element.
Figure 2:
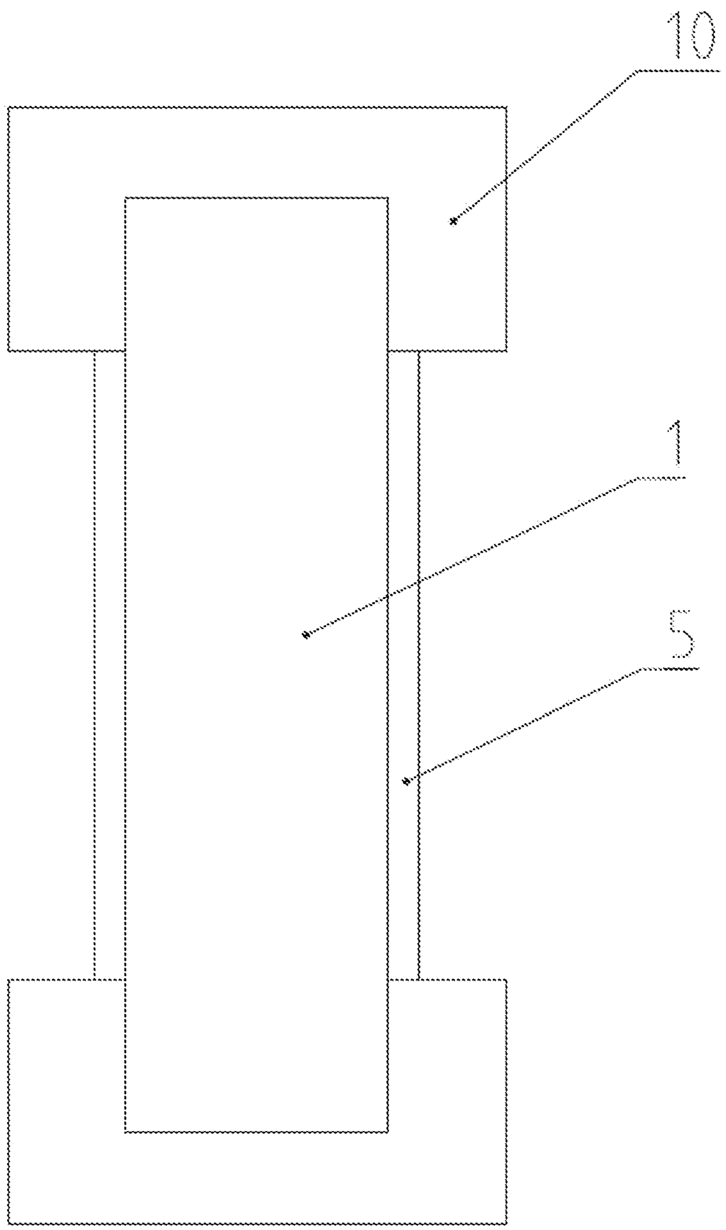
FIG. 2 is an internal structural representation of Example 1.

The present invention will be introduced below through examples as shown in the accompanying drawings, however the present invention will not be limited to the embodiments introduced, and any improvements or replacements made on the basis of the spirit of the present examples will still belong to the scope as claimed in the claims of the present invention:

Example 1: In the ceramic electric heating element as shown in FIG. 2, the ceramic electric heating element is a two-layered ceramic electric heating element and includes an inner resistive layer 1, where the ceramic electric heating element is completely wrapped by an outer insulating layer 5, and an electrically conductive cover 10 is provided on both ends of the ceramic electric heating element.

The employment of the ceramic electric heating element according to this example can prevent a short circuit resulting from over-lapping the ceramic electric heating element with metal in the processes of installation and use, and can also prevent a a short circuit due to carbon deposition on the surface of the ceramic electric heating element after using it for a long period of time. In addition, the ceramic electric heating element has advantages of high strength, long service life and long one-time power-on duration.

The ceramic electric heating element according to this example is a cylinder with a strength of 25 KG, a service life of 25,000 switching cycles before failure, and a one-time power-on duration of up to 1.2 minutes.

Figure 3:
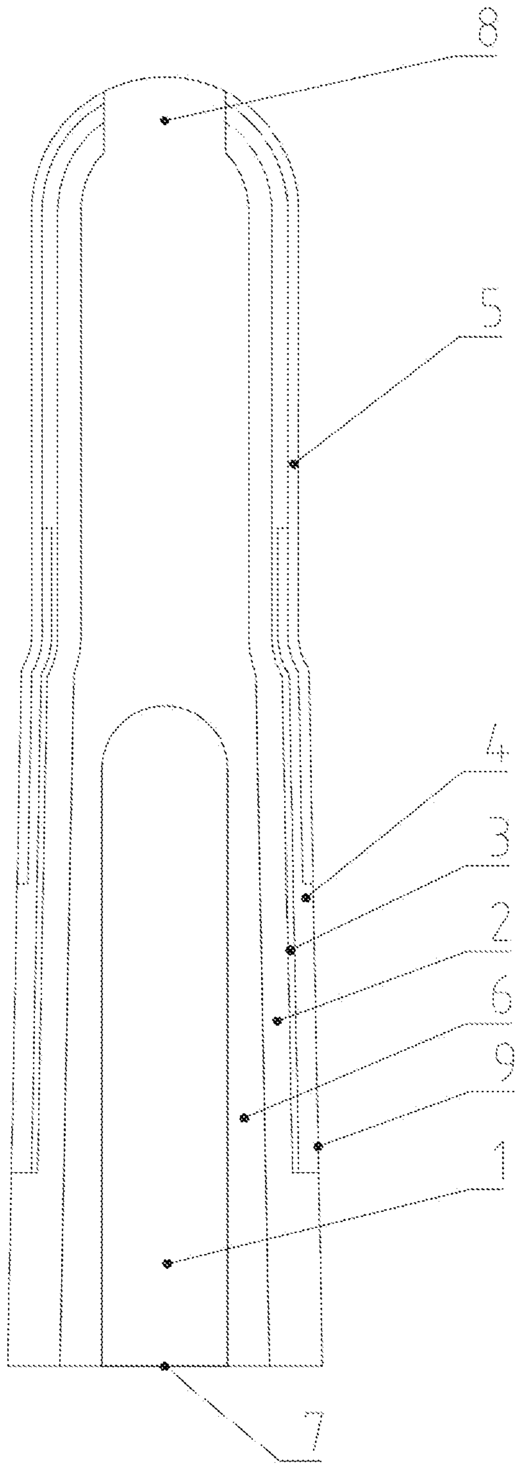
FIG. 3 is an internal structural representation of Example 2.

Example 2: In the ceramic electric heating element as shown in FIG. 3, an upper tip portion of the ceramic electric heating element is completely wrapped by an insulating layer. The ceramic electric heating element has six layers, and the ceramic electric heating element has, from the inside out, an inner conducting layer 1, an inner resistive layer 6, an inner insulating layer 2, an outer resistive layer 3, an outer conducting layer 4, and an outer insulating layer 5, respectively.

The ceramic electric heating element according to this example is a cylinder, where the inner conducting layer 1 is located in the center of the ceramic electric heating element; the inner resistive layer 6 wraps the inner conducting layer 1 on the outside; the inner insulating layer 2 wraps the inner conducting layer 6 on the outside, and the inner insulating layer 2 is divided into two segments, with the diameter of the lower segment being greater than that of the upper segment; the outer resistive layer 3 wraps the upper part of the inner insulating layer 2 on the outside, and the outer resistive layer 3 is divided into two segments, with the diameter of the upper segment of the outer resistive layer 3 being less than that of the lower segment of the inner insulating layer 2; the outer conducting layer 4 wraps the lower segment of the outer resistive layer 3 on the outside, and the outer conducting layer 4 is divided into two segments, with the diameter of the lower segment equaling to that of the lower segment of the inner insulating layer 2, and the diameter of the upper segment equaling to that of the upper segment of the outer resistive layer 3; the outer insulating layer 5 wraps the upper segment of the outer conducting layer 4 and the upper segment of the outer resistive layer 3 on the outside, with the diameter of the outer insulating layer 5 equaling to that of the lower segment of the outer conducting layer 4; and the lower part of the inner conducting layer 1 is a spot 7 where a central electrode is located, the upper end of the inner resistive layer 6 has a connecting hole 8, and the outside of the lower part of the outer conducting layer 4 is a spot 9 where a side electrode is connected. The spot 7 where the central electrode is located is solid.

The employment of the ceramic electric heating element according to this example allows for a quick start and quick heating up, can prevent a short circuit resulting from over-lapping the ceramic electric heating element with metal in the processes of installation and use, and can also prevent a short circuit due to carbon deposition on the surface of the ceramic electric heating element after using it for a long period of time. In addition, the ceramic electric heating element has advantages of high strength, long service life and long one-time power-on duration.

The ceramic electric heating element according to this example has a strength of 45 KG, a service life of 40,000 switching cycles before failure, and a one-time power-on duration up to 8 minutes.

Figure 4:
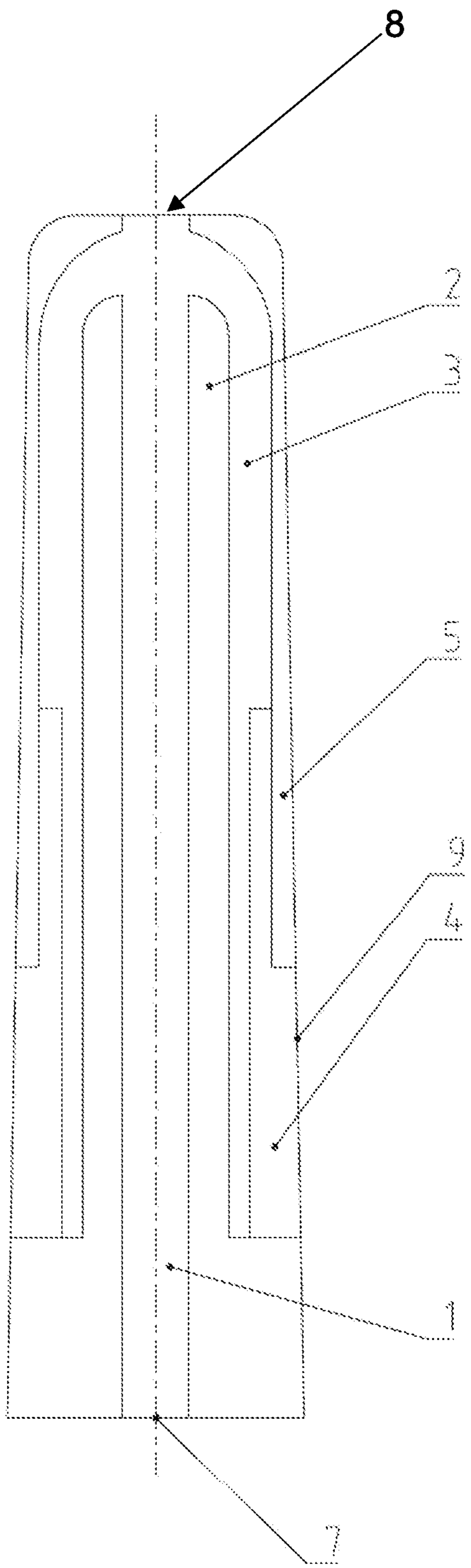
FIG. 4 is an internal structural representation of Example 3.

Example 3: In the ceramic electric heating element as shown in FIG. 4, an upper tip portion of the ceramic electric heating element is completely wrapped by an insulating layer. The ceramic electric heating element has five layers, and the ceramic electric heating element has, from the inside out, an inner conducting layer 1, an inner insulating layer 2, an outer resistive layer 3, an outer conducting layer 4, and an outer insulating layer 5, respectively.

The ceramic electric heating element according to this example is a flat-shaped body, where the inner conducting layer 1 is located in the center of the ceramic electric heating element; the inner insulating layer 2 wraps the inner conducting layer 1 on the outside, and the inner insulating layer 2 is divided into two segments, with the peripheral profile of the lower segment being greater than that of the upper segment; the outer resistive layer 3 wraps the upper part of the inner insulating layer 2 on the outside, and the outer resistive layer 3 is divided into two segments, with the peripheral profile of the lower segment being less than that of the upper segment, and the peripheral profile of the upper segment of the outer resistive layer 3 being less than that of the lower segment of the inner insulating layer 2; the outer conducting layer 4 wraps the lower segment of the outer resistive layer 3 on the outside, and the outer conducting layer 4 is divided into two segments, with the peripheral profile of the lower segment equaling to that of the lower segment of the inner insulating layer 2, and the peripheral profile of the upper segment equaling to that of the upper segment of the outer resistive layer 3; the outer insulating layer 5 wraps the upper segment of the outer conducting layer 4 and the upper segment of the outer resistive layer 3 on the outside, with the peripheral profile of the outer insulating layer 5 equaling to that of the lower segment of the outer conducting layer 4; and the lower part of the inner conducting layer 1 is a spot 7 where a central electrode is located, the upper end of the inner insulating layer 2 has a connecting hole 8, and the outside of the lower part of the outer conducting layer 4 is a spot 9 where a side electrode is connected. The spot 7 where the central electrode is located is solid, and the ceramic electric heating element is a cylinder.

The employment of the ceramic electric heating element according to this example can prevent a short circuit resulting from over-lapping the ceramic electric heating element with metal in the processes of installation and use, and can also prevent a short circuit due to carbon deposition on the surface of the ceramic electric heating element after using it for a long period of time. In addition, the ceramic electric heating element has advantages of high strength and long service life. Moreover, this example further has advantages of a simplified process and a simple structure.

The ceramic electric heating element according to this example has a strength of 35 KG, a service life of 30,000 switching cycles before failure, and a one-time power-on duration up to 6 minutes.

Figure 5:
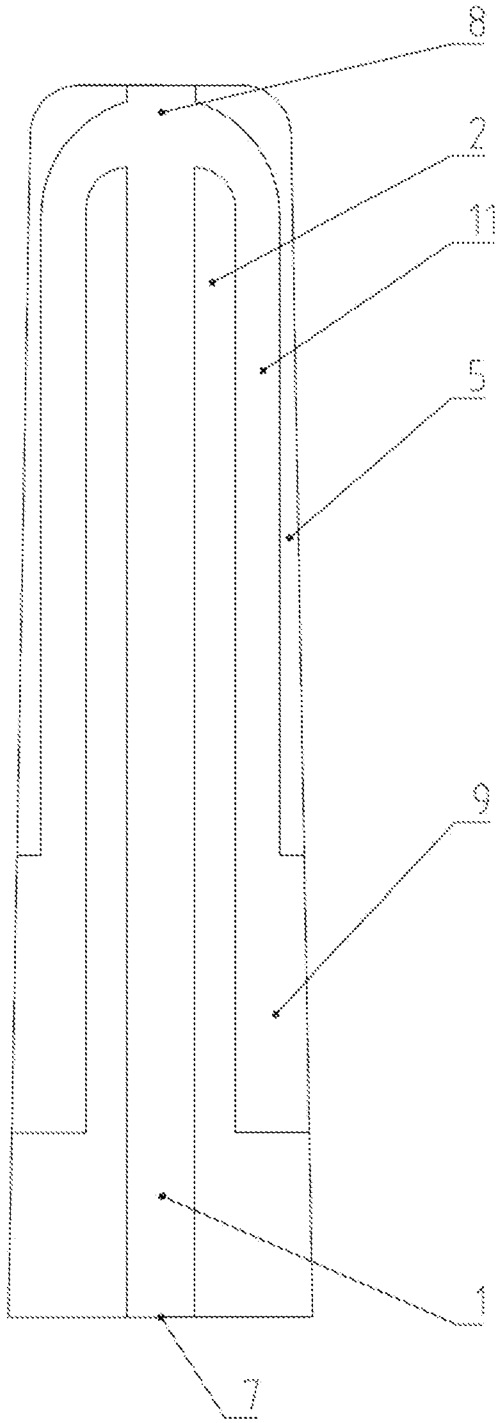
FIG. 5 is an internal structural representation of Example 5.

Example 4: In the ceramic electric heating element as shown in FIG. 5, the ceramic electric heating element is completely wrapped by an insulating layer.

The ceramic electric heating element has four layers, and the ceramic electric heating element has, from the inside out, an inner conducting layer 1, an inner insulating layer 2, a resistive layer 11, and an outer insulating layer 5, respectively.

The ceramic electric heating element according to this example is a flat-shaped body, where the inner conducting layer 1 is located in the center of the ceramic electric heating element; the inner insulating layer 2 wraps the inner conducting layer 1 on the outside, and the inner insulating layer 2 is divided into two segments, with the peripheral profile of the lower segment being greater than that of the upper segment; the resistive layer 11 wraps the upper part of the inner insulating layer 2 on the outside, and the resistive layer 11 is divided into two segments, with the peripheral profile of the upper segment being less than that of the lower segment, and the peripheral profile of the lower segment of the resistive layer 11 equaling to that of the lower segment of the inner insulating layer 2; the outer insulating layer 5 wraps the upper segment of the resistive layer 11 on the outside, with the peripheral profile of the outer insulating layer 5 equaling to that of the lower segment of the resistive layer 11; and the lower part of the inner conducting layer 1 is a spot 7 where a central electrode is located, the upper end of the resistive layer 11 has a connecting hole 8, and the outside of the lower part of the outer resistive layer 11 is a spot 9 where a side electrode is connected.

The employment of the ceramic electric heating element according to this example can prevent a short circuit resulting from over-lapping the ceramic electric heating element with metal in the processes of installation and use, and can also prevent a short circuit due to carbon deposition on the surface of the ceramic electric heating element after using it for a long period of time. In addition, the ceramic electric heating element has advantages of high strength and long service life. Moreover, this example further has advantages of a simplified process and a low cost.

The ceramic electric heating element according to this example has a strength of 30 KG, a service life of 30,000 switching cycles before failure, and a one-time power-on duration up to 5 minutes.

What is claimed is:

1. A ceramic electric heating element wherein:

the ceramic electric heating element has six layers that include, from the inside out, an inner conducting layer (1), an inner resistive layer (6), an inner insulating layer (2), an outer resistive layer (3), an outer conducting layer (4), and an outer insulating layer (5), respectively;

an upper tip portion of the ceramic electric heating element is completely wrapped by the outer insulating layer;

the inner conducting layer (1) is located in the center of the ceramic electric heating element;

the inner resistive layer (6) wraps the inner conducting layer (1) on the outside;

the inner insulating layer (2) wraps the inner resistive layer (6) on the outside, and the inner insulating layer (2) is divided into two segments, with the peripheral profile of the lower segment being greater than that of the upper segment;

the outer resistive layer (3) wraps the upper part of the inner insulating layer (2) on the outside, and the outer resistive layer (3) is divided into two segments, with the peripheral profile of the upper segment of the outer resistive layer (3) being less than that of the lower segment of the inner insulating layer (2);

the outer conducting layer (4) wraps the lower segment of the outer resistive layer (3) on the outside, and the outer conducting layer (4) is divided into two segments, with the peripheral profile of the lower segment equaling to that of the lower segment of the inner insulating layer (2), and the peripheral profile of the upper segment equaling to that of the upper segment of the outer resistive layer (6);

the outer insulating layer (5) wraps the upper segment of the outer conducting layer (4) and the upper segment of the outer resistive layer (3) on the outside, with the peripheral profile of a lower segment of the outer insulating layer (5) equaling to that of the lower segment of the outer conducting layer (4);

the lower part of the inner conducting layer (1) has a spot (7) where a central electrode is located, the upper end of the inner resistive layer (6) has a connecting hole (8), and the outside of the lower part of the outer conducting layer (4) has a spot (9) where a side electrode is connected;

the spot (7) where the central electrode is located is solid; and an electrically conductive ceramic electrode is welded to the spot (7).

2. The ceramic electric heating element of claim 1, wherein, the ceramic electric heating element is a cylinder.

3. The ceramic electric heating element of claim 1, wherein, the ceramic electric heating element is a flat-shaped body.

4. A ceramic electric heating element wherein:

the ceramic electric heating element has four layers that include, from the inside out, an inner conducting layer (1), an inner insulating layer (2), a resistive layer (11), and an outer insulating layer (5), respectively;

the inner conducting layer (1) is located in the center of the ceramic electric heating element;

the inner insulating layer (2) wraps the inner conducting layer (1) on the outside, and the inner insulating layer (2) is divided into two segments, with the peripheral profile of the lower segment being greater than that of the upper segment;

the resistive layer (11) wraps the upper part of the inner insulating layer (2) on the outside, and the resistive layer (11) is divided into two segments, with the peripheral profile of the upper segment being less than that of the lower segment, and the peripheral profile of the lower segment of the resistive layer (11) equaling to that of the lower segment of the inner insulating layer (2);

the outer insulating layer (5) wraps the upper segment of the resistive layer (11) on the outside, with the peripheral profile of the outer insulating layer (5) equaling to that of the lower segment of the resistive layer (11);

the lower part of the inner conducting layer (1) has a spot (7) where a central electrode is located, the upper end of the inner resistive layer (11) has a connecting hole (8), and the outside of the lower part of the resistive layer (11) has a spot (9) where a side electrode is connected;

the spot (7) where the central electrode is located is solid; and an electrically conductive ceramic electrode is welded to the spot (7).

5. The ceramic electric heating element of claim 4, wherein, the ceramic electric heating element is a cylinder.

6. The ceramic electric heating element of claim 4, wherein, the ceramic electric heating element is a flat-shaped body.

* * * * *